Nov. 27, 1934.  H. F. TÖNNIES  1,982,406
EXPOSURE METER
Filed Aug. 7, 1931  2 Sheets-Sheet 2

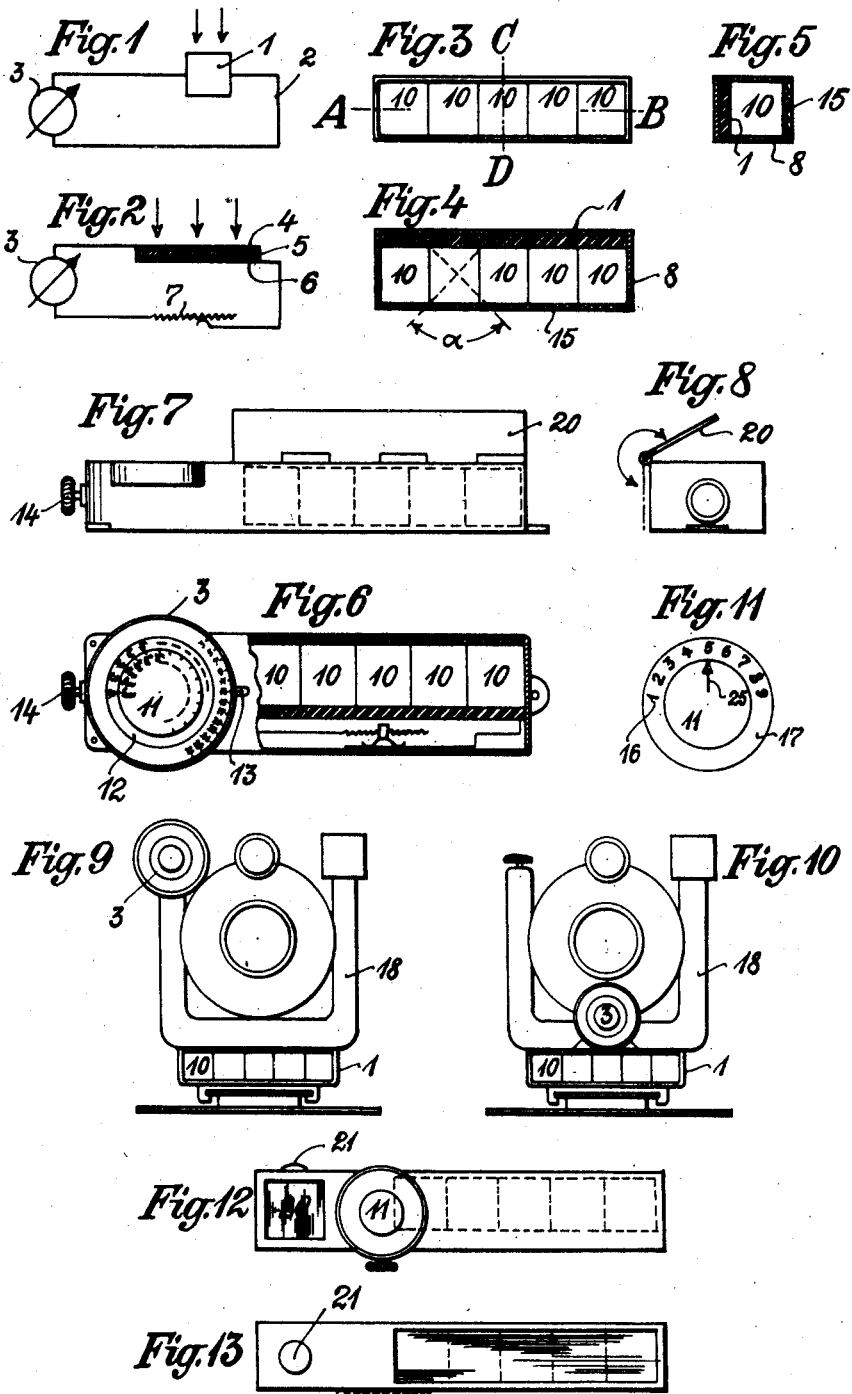

Inventor:
Hans Ferdinand Tönnies

Patented Nov. 27, 1934

1,982,406

UNITED STATES PATENT OFFICE 1,982,406

EXPOSURE METER

Hans Ferdinand Tönnies, Altona/Grossflottbek, Germany

Application August 7, 1931, Serial No. 555,750
In Germany August 18, 1930

15 Claims. (Cl. 88—23)

The present invention relates to auxiliary apparatus for photographic cameras and more particularly to exposure meters. The principal object of the present invention is to provide an exposure meter which directly indicates the time of exposure necessary for taking photographs, and this object is attached by connecting a photoelectric cell, which comprises a receiving electrode, an intermediate layer possessing unidirectional conductivity and a counter electrode, with a galvanometer in such manner that the time of exposure can be ascertained from the deflection of the galvanometer at any given time.

Preferred constructional forms according to the invention are illustrated by way of example in the accompanying drawings in which:

Figs. 1 and 2 are diagrammatic representations of an exposure meter device according to the invention, Figs. 3 to 5 show the mechanical construction of a photo-electric cell as employed according to the invention, Fig. 3 being a front view, Fig. 4 a section taken on line A—B of Fig. 3, and Fig. 4 being a section taken on line C—D of Fig. 3.

Fig. 6 shows the exposure meter in plan with part of the case broken away.

Fig. 7 shows the exposure meter in back view, and Fig. 8 is a side view thereof.

Figs. 9 and 10 show the exposure meter according to the invention built into the standard of a folding camera in different constructional forms, and Figs. 12 and 13 illustrate still further constructional forms.

Fig. 11 shows one form of the exposure indicator.

Figure 14:
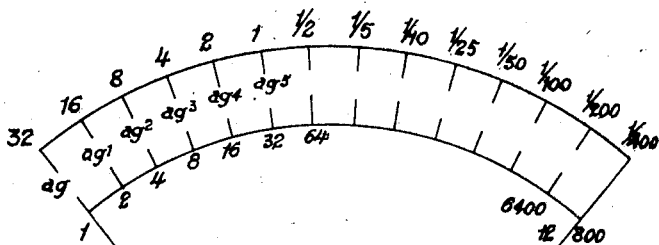
Figs. 14 and 15 are diagrammatic representations of the scale of the galvanometer employed.

Referring to the drawings, the rays of light strike in the direction of the arrows on the photoelectric cell 1 and set free electrons therein, which pass through the circuit 2 in which a galvanometer 3 constructed so as to form an exposure indicator is connected. The photo-electric cell may be constituted by a metal cell in the manner shown diagrammatically in Fig. 2. The cell consists of a receiving electrode 4, a layer 5 possessing unidirectional conductivity and a counter electrode 6. The electrode 4 may be of copper and the layer 5 (screen layer) may be of cuprous oxide. The rays of light penetrate the electrode 4 and set free a stream of electrons which pass from the layer 5 through the counter electrode 6 and the circuit 2. It is preferable to connect in the circuit a regulating resistance 7 which serves for the fine adjustment of the apparatus. The photo-electric cell is preferably constructed in such manner that it constitutes a plurality of chambers located side by side. The cell proper 1 which emits the electrons is built into an elongated case 8 which is provided with a number of partitions 9 so as to form chambers 10. The chambers are so constructed that those of the light rays falling on the receiving electrode which have the greatest lateral inclination only enclose an angle of a certain magnitude, for example, the angle α. The angle α may be so chosen that it is approximately equal to the angle of the image received by the camera or is somewhat smaller than the latter.

The above described construction of the photo-electric cell is necessary in order to ensure that only such light strikes upon the electrode as passes from the object to be photographed through the objective of the camera to the film or dry plate, or at least that light coming from a greater angle than that of the camera image does not reach the electrode. Otherwise false exposure indications would be obtained in consequence of the action of light rays which arrive at the electrode from the sides or from above. If desired, several rows or chambers of the kind described may be arranged one above the other and furthermore, if desired, a single photo-electric cell may be arranged in each chamber. The photo-electric cells may be connected in parallel or in series.

Fig. 6 shows the exposure meter in plan, a part of the upper wall of the case being omitted in order to show the interior thereof. Fig. 7 shows the exposure meter as seen from the rear, and Fig. 8 as seen from the side. The exposure meter consists of the photo-electric cell proper 1 provided with chambers 10, the regulating resistance 7 and the galvanometric exposure indicator 3, the details of the latter not being shown in the drawings. The indicator comprises a disc 11 which is actuated by the galvanometer and on which a scale showing the times of exposure is provided. Above or below the disc 11 a disc 12 is arranged which carries two scales, namely, a scale showing the stops of the objective of the camera and a scale showing the degrees of sensitiveness of the photographic plate, for instance, in degrees "Scheiner" or in degrees "Hurter & Driffield". The disc 12 can be turned by means of a button 14 in such manner that the figure indicating the sensitiveness of the plate is brought opposite an index line 13. Before reading off the time of exposure it is only necessary to adjust the figure representing the degrees of the emulsion sensitiveness to the line 13.

The chambers 10 are closed by a glass plate 15. In addition to this a metal flap 20 is provided by means of which the apparatus can be closed up when not in use.

Inasmuch as the exposure meter must only measure the strength of that particular light which passes through the objective into the camera and which corresponds approximately to the angle of field of the camera but in no case to a larger angle of field, the apparatus is preferably provided with a view finder which is arranged as close as possible to the exposure meter 11. In Figs. 12 and 13 the arrangement of the exposure meter together with a reflecting view finder is shown, the objective lens of the said view finder being denoted by the reference numeral 21 and its collecting lens by the reference numeral 22. In order to measure the time of exposure with an exposure meter equipped in such manner, the apparatus is held in such a position that the picture which is to be photographed appears in the view finder and the time of exposure is then read off on the indicator 11.

It is preferable to build the exposure meter into the camera during the process of manufacture in the factory especially in the case of valuable cameras, in order that the said exposure meter may be always at hand ready for use. The case 8 provided with the chambers 10 and the photo-electric cell 1 is preferably built into the standard 18 below the objective of the camera.

The galvanometric exposure indicator 3 may be arranged on one side at the top of one limb of a standard or may be arranged above the photo-electric cell below the objective as shown in Fig. 10. The indicator may also advantageously be arranged on the movable bottom of the camera so that the times of exposure can be read off immediately at a glance after the opening of the camera.

The exposure indicator may also be constructed in other ways. For instance, the disc 11 may be provided merely with an arrow 25 (Fig. 11), which is turned by the galvanometer relatively to a stationary disc 17 provided with indications 16. The deflections of the arrow of the galvanometer and the distances apart of the indications 16 are then placed in such relationship to one another that the time of exposure can be ascertained from the indication of the apparatus by the aid of a table. The distances apart of the indication 16 are preferably chosen in such manner that each indication corresponds to a time of exposure double as long as that corresponding to the preceding indication.

The scales may also be arranged so that their order of succession starting from the centre is as follows:—

Stops, times of exposure, degrees of sensitiveness of the plate.

The construction of the galvanometer serving to indicate the time of exposure has to be different from the galvanometers which serve as amperemeter or voltmeter as well with regard to the kind of scale on top of it as with regard to the mechanical part inside the galvanometer. The scale has to be different inasmuch as the value of the graduations of the scale have to form a geometrical progression of the law $aq^0$, $aq^1$, $aq^2$, $aq^3$ .... $aq^{n-1}$, whereas the value of the graduations of the scale of an amperemeter or voltmeter form an arithmetical progression of the law $a$, $a+d$, $a+2d$, $a+3d$ .... $a+(n-1)d$.

The necessity of using a scale with graduations whose value form a geometrical progression arises from the graduations of the time of exposure and of the diaphragms of the camera lens used at the shutters of the cameras, which also form a geometrical progression.

The construction of the scale has to differ from that of the common amperemeter also for another reason. This reason is occasioned by the enormous range which the scale has to have if it shall answer sufficiently to its purpose. It may be supposed that the time indication from 32 seconds to 1/400 second is sufficiently comprehensive. In this case the range of the instrument would be 1:12800 because the time of 32 seconds is 12800 times longer than that of 1/400 second. Now if the space between the lines of 32 seconds and 16 seconds would be=1 mm, the whole length of the scale had to be=12800 mm or 12.8 meters. Also if the scale is divided into several parts located over each other as it is sometimes done with the amperemeter employing resistances the single parts of the scale would be too large for a convenient use and easily occasion mistakes. Especially for the amateur photographer it is absolutely necessary that all time indications form one row only.

Fig. 14 shows diagrammatically the corresponding arrangement and the mathematical relations of the graduations. The graduations indicating the times of exposure from 32—1/400 second are arranged over the outer circle, the mathematical values of them in a geometrical progression=$aq^0$, $aq^1$, $aq^2$ .... under this circle. In this progression is $a=32$ and $q=\frac{1}{2}$. Below the inner circle the ciphers of the relative light power are arranged corresponding to the times of exposure. For instance if the time of exposure of 32 seconds has to be chosen under the light power 1 when using a certain diaphragm and emulsion sensitiveness, a 12800 times greater light power has to be active as at the time of exposure of 1/400 second. The Fig. 14 shows furthermore that the light power has to grow from the value 1 to 2 when the indication needle of the galvanometer is swinging from 32 to 16 seconds; but that it has to grow from the value 6400 to 12800 when the needle shall swing from 1/200 to 1/400 second. This means that the light power swinging the needle from 1/200 to 1/400 second has to be 6400 times greater than the light power swinging the needle from 32 to 16 seconds.

It is advisable to arrange the ciphers so that their intervals are nearly equal. In order to let the needle or indicator of the galvanometer give the right indication in accordance to these intervals an arrangement inside the galvanometer has been provided that is checking or controlling the movement of the needle accordingly. This arrangement may consist of a spring or some springs or of an electric appliance.

To calculate the intensity of the relative light power which has to drive the needle of the galvanometer from one marked numerical value of the scale to the next one may serve the equation $$\frac{n-1}{a}n = a(q^n - q^{n-1})$$

To calculate the total sum of light power to drive the needle from the numerical value of 32 seconds to a numerical value beyond several intervals the equation of $$\sum_{i}^{n} i_a = \frac{a(q^{n-1})}{q-1}$$

may be employed. By these equations also the power of checking or braking the needle may be computed in order to let it correspond to the scale.

Figure 15:
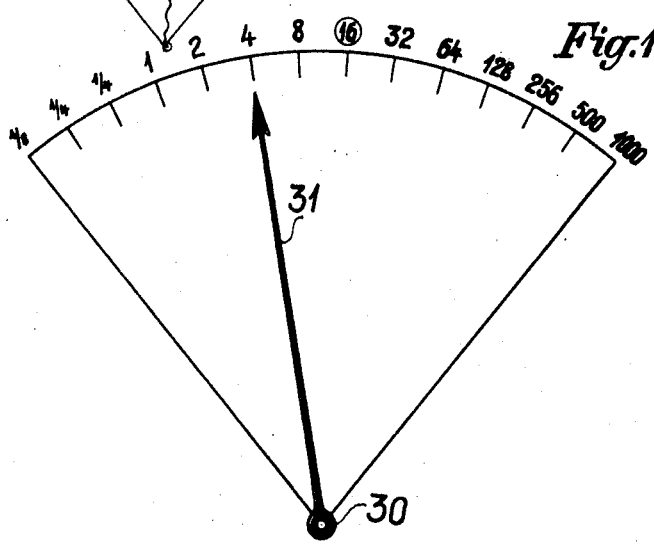

Fig. 15 shows a similar arrangement as Fig. 14, but instead of numerical values indicating times of exposure other graduations are arranged which indicate the quantity of pictures made by motion picture cameras during a second. The needle 32 of the galvanometer is swinging around point 30.

Figure 16:
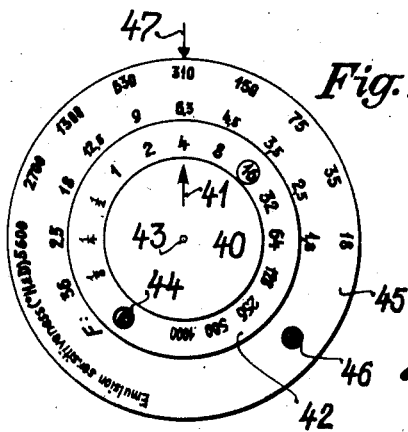
Fig. 16 shows another form of exposure indicator.

The numerical value indicated by the needle 32 is transferred to a table consisting of several discs as shown in Fig. 16. If, for example, the numerical value 4 is indicated the disc 42 is turned at its knob 44 around the point 43 so far that the number 4 stands opposite the arrow 41 on the disc 40. Also the disc 45 is turned by its knob 46 so that the numerical value of the employed emulsion sensitiveness registers with the arrow 47. Then the numerical graduations indicating the number of pictures taken by a cine camera in a second and the numerical graduations indicating the diaphragms of the camera lens are properly set opposite each other. For instance when making 16 pictures in a second and using an emulsion speed of 310° H & D the diaphragm F:3,5 has to be chosen.

Instead of giving the electric cell 1 always the unshielded intensity of light an arrangement may be chosen that is shielding off so much light that the needle of the galvanometer always points at the same index. The shielding off of the light may be done by a slide by which more or less of the electric cell 1 is covered. The movement of the slide is then used as an indicator for finding the time of exposure or the diaphragm of the camera lens to be used by coupling the movement of the slide to an indicator accordingly.

In order to magnify the electric current generated by the cell 1 amplifiers may be employed as used in the radio technics.

The glass plate 15 may also be of such a colour that only light rays of a certain definite wave length can act on the photo-electric cell or a suitable light filter may be inserted in the path of the rays. Again, the elements of the photo-electric cell may be so chosen that a definite selective action with regard to the rays of different wave lengths is obtained, the said action being such as is desirable for photographic purposes.

What I claim is:—

1. In a photo-electric exposure meter, the combination with a current-generating photo-electric cell including photosensitive material cooperating with a back electrode and a light-receiving electrode, and an electrical measuring instrument connected across said electrodes and having a moving system offering a progressively increasing resistance to displacement by increasing current output from said cell, whereby said instrument has an extended range of significant scale values and a substantial response for small changes in light values at the lower limit of its operating range, of means restricting the angular spread of the beam of light rays which may reach said cell to substantially the image angle of a camera, said restricting means comprising casing means including a tubular chamber of a substantially uniform cross-section conforming in shape and size substantially to the shape and size of the light-receiving electrode of said cell, said cell being arranged across the inner end of said chamber and the outer open end of the chamber being adapted to be directed towards the scene to be photographed.

2. A photo-electric exposure meter as claimed in claim 1, in combination with a camera, said measuring instrument and said cell being mounted on said camera.

3. A photo-electric exposure meter comprising an electrical measuring instrument, a photo-electric cell within a casing and spaced from one side thereof, the said side of the casing having an opening for admitting light rays to said cell, and means restricting the light rays which may reach said cell to a plurality of separate groups of light rays which each have a limited angular spread.

4. A photo-electric exposure meter as claimed in claim 3, in combination with a transparent plate secured to said casing over the said opening.

5. A photo-electric exposure meter as claimed in claim 3, wherein said means for restricting the light rays comprises a multi-compartment baffle within said casing and forming a grating in front of said cell.

6. A photo-electric exposure meter as claimed in claim 3, in combination with a camera, said measuring instrument and said cell casing being separately mounted on said camera.

7. A photo-electric exposure meter comprising, a casing carrying an electrical measuring instrument, a photo-electric cell within said casing and spaced from one side thereof, the said side of the casing having an opening for admitting light rays to said cell, and means restricting the light rays which reach said cell through said opening to a plurality of beams of light rays each having a limited angular spread.

8. A photo-electric exposure meter as claimed in claim 7, wherein said cell is of the multiple-layer disc type, and said measuring instrument is supported on said casing with the indicating element thereof movable in a plane normal to the said open side of said casing and to the cell mounted therein.

9. A photo-electric exposure meter as claimed in claim 7, wherein said cell is of the multiple-layer disc type, and said measuring instrument is supported on said casing with the indicating element thereof movable in a plane parallel to the said open side of said casing and to the cell mounted therein.

10. A photo-electric exposure meter as claimed in claim 7, in combination with an adjustable resistance in circuit with said cell and measuring instrument.

11. An exposuremeter for photographic purposes, comprising a photoelectric cell actuated by light without the aid of liquid electrolyte, this cell being constituted by a casing, partitions within said casing so as to form chambers therein, a transparent plate in front of said chambers, a photo-electric element arranged within said casing and composed of a receiving electrode in front of which said chambers act as a grating, of a layer possessing unidirectional conductivity, and of a counter electrode, a circuit in connection with said electrodes and intended for the passage of electrons, an adjustable regulating resistance, provided within said circuit, the said chambers being constructed so that only light rays having an angle of incidence lying within a certain maximum limiting value can fall on said receiving electrode, and a galvanometer arranged within said circuit and constituting the exposure indicator proper.

12. An exposuremeter for photographic purposes, comprising a photoelectric cell actuated by light without the aid of liquid electrolyte, this cell being constituted by a casing, partitions within said casing so as to form chambers therein, a transparent plate in front of said chambers, a photoelectric element arranged within said casing and composed of a receiving electrode in front of which said chambers act as a grating, of a layer possessing unidirectional conductivity, and of a counter electrode, a circuit in connection with said electrodes and intended for the passage of said electrons, an adjustable regulating resistance, provided within said circuit, the said chambers being constructed so that only light rays having an angle of incidence lying within a certain maximum limiting value can fall on said receiving electrode, a galvanometer arranged within said circuit and associated with the exposure indicator proper, the said indicator comprising a rotatable disc having its movements controlled by said galvanometer and carrying a scale showing the times of exposure, and another disc arranged above or below said first mentioned disc and carrying two scales showing, respectively, the stops of the camera lens and the degrees of sensitiveness of the photographic plates to be used, said discs co-operating to determine the time of exposure.

13. An exposure meter comprising in combination: a photo-electric cell composed of solid materials only and converting light automatically without the help of a battery into electricity; a plurality of chambers arranged in front of said cell, the opening of each chamber being as great as the co-ordinated part of the cell behind it and each chamber being so constructed that the angle of the cone of light rays hitting the cell is substantially equal to the image angle of a normal camera; and a galvanometer for indicating an exposure factor connected in circuit with said cell.

14. An exposure meter for photographic purposes, comprising a photo-electric cell actuated by light without the aid of liquid electrolyte, this cell being constituted by a casing of elongated shape, partitions within said casing so as to form chambers therein, a glass plate in front of said chambers, a metal flap hingedly mounted on said casing and adapted to shut off said chambers, a photo-electric element arranged within said casing and composed of a receiving electrode in front of which said chambers act as a grating, of a layer possessing uni-directional conductivity, and of a counter electrode, a circuit in connection with said electrodes and intended for the passage of said electrons, an adjustable regulating resistance, provided within said circuit, the said chambers being constructed so that only light rays having an angle of incidence lying within a certain maximum limiting value can fall on said receiving electrode, a galvanometer arranged within said circuit and associated with the exposure indicator proper, the said indicator comprising a rotatable disc having its movements controlled by said galvanometer and carrying a scale showing the times of exposure, and another disc arranged above or below said first mentioned disc and carrying two scales showing, respectively, the stops of the camera lens and the degrees of sensitiveness of the photographic plates to be used, said discs co-operating to determine the time of exposure, and manipulating means for moving said second named disc relatively to said first named disc for the purpose of reading off the time of exposure.

15. An exposure meter as specified in claim 12 in further combination with a reflecting view finder comprising an objective lens and a collecting lens, the image of the object to be photographed appearing in said view finder.

HANS FERDINAND TÖNNIES.